United States Patent
Higashigawa et al.

(10) Patent No.: US 7,319,698 B2
(45) Date of Patent: Jan. 15, 2008

(54) RECOVERY SYSTEM FOR RESTORING PRESERVED REGENERATION DATA

(75) Inventors: Levan Higashigawa, Kawasaki (JP); Shoichi Sano, Kawasaki (JP); Yuzuru Koga, Kawasaki (JP); Tomokazu Shirakura, Kawasaki (JP); Makoto Hyuga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1082 days.

(21) Appl. No.: 10/378,293

(22) Filed: Mar. 3, 2003

(65) Prior Publication Data

US 2004/0013121 A1 Jan. 22, 2004

(30) Foreign Application Priority Data

Jul. 18, 2002 (JP) ............... 2002-210082

(51) Int. Cl.
*H04L 12/28* (2006.01)
*H04L 12/56* (2006.01)

(52) U.S. Cl. ............... 370/394; 370/474; 714/748; 714/749; 714/746

(58) Field of Classification Search ........ 370/229–235, 370/394, 474, 476; 714/748, 749, 746
See application file for complete search history.

(56) References Cited

U.S. PATENT DOCUMENTS

| | | | |
|---|---|---|---|
| 6,377,981 B1 | 4/2002 | Ollikainen et al. | |
| 2002/0152299 A1* | 10/2002 | Traversat et al. | 709/223 |
| 2005/0094667 A1* | 5/2005 | Dahlman et al. | 370/473 |
| 2006/0155870 A1* | 7/2006 | Tucker | 709/235 |
| 2006/0256794 A1* | 11/2006 | Rezaiifar et al. | 370/394 |

FOREIGN PATENT DOCUMENTS

| | | |
|---|---|---|
| EP | 1164790 | 12/2001 |
| JP | 6252897 | 9/1994 |
| JP | 7221789 | 8/1995 |
| JP | 10-070523 | 3/1998 |
| JP | 10-308932 | 11/1998 |
| JP | 11018086 | 1/1999 |
| JP | 2001177523 | 6/2001 |
| JP | 2001-186423 | 7/2001 |
| JP | 2001-218273 | 8/2001 |
| JP | 2001-358966 | 12/2001 |
| JP | 2001-524765 | 12/2001 |
| JP | 2002084239 | 3/2002 |
| JP | 2002169738 | 6/2002 |
| WO | WO 99/27462 | 6/1999 |

* cited by examiner

*Primary Examiner*—Ajit Patel
(74) *Attorney, Agent, or Firm*—Greer, Burns & Crain, Ltd.

(57) ABSTRACT

A receiver including: a data regeneration mechanism that receives and regenerates data transmitted in units of a packet; a storage device in which received data is stored; a packet ID extraction unit that extracts a packet ID indicating a packet to be re-received; and a retransmission request unit that transmits retransmission request information, which requests retransmission of a packet to be re-received, to a transmitter. The transmitter retransmits only a packet, which is identified with a packet ID specified in the retransmission request information sent from the receiver, to the receiver. The receiver overwrites data, which is stored in the storage device, with data contained in a packet retransmitted from the transmitter. There is thus provided a recovery system for restoring data, which is preserved in the storage device, while regenerating data without stopping a motion picture irrespective of whether a lost packet is present.

3 Claims, 9 Drawing Sheets

RECOVERY SYSTEM FOR RESTORING PRESERVED REGENERATION DATA

BACKGROUND OF THE INVENTION

1. Field of the Invention

The present invention relates to a recovery system for restoring preserved regeneration data. More particularly, the present invention is concerned with a recovery system that restores data using a backup when a transmitter transmits, in real time, image data or the like to a receiver in the form of a packet and the data received by the receiver suffers an error or a loss.

2. Description of the Related Art

A transmitter-receiver system consists mainly of a transmitter that distributes data including image data and places data created in real time, or existing data, on a network, and a receiver that receives and regenerates the data stream. In the transmitter-receiver system, the receiver includes a data reception mechanism, a data regeneration mechanism that regenerates an output of the data reception mechanism, and a storage device in which the output of the data reception mechanism is preserved.

The receiver that gives priority to regeneration does not include a large-capacity intermediate buffer. This is intended to prevent the speed of received data from being delayed in a data flow transmitted from the transmitter while keeping a time stamp specified in a data stream transmitted therefrom. Moreover, the receiver does not issue a regeneration request to the transmitter despite the occurrence of a lost packet. When the receiver preserves data while regenerating other data, an error packet or data from which a packet has been lost may be preserved in the storage device included in the receiver, though it depends on the condition of a network or the performance of the receiver (the speed at which a hard disk is written or the capability of a CPU).

As for conventional recovery systems for restoring preserved regeneration data, for example, one described in Japanese Unexamined Patent Publication No. 10-70523 is well known. The publication disclosed an art that, when a transmitting side retransmits data, a receiving side indicates in the form of a bit map what packet has caused an error, and transmits the bit map to the transmitting side. Compared with a method in which a transmitting side follows a retransmission procedure every time an error packet is detected, the disclosed method proves efficient.

Moreover, a recovery system disclosed in Japanese Unexamined Patent Publication No. 10-308932 is also well known. The publication is analogous to Japanese Unexamined Patent Publication No. 10-70523. Namely, the publication has disclosed an art attempting to improve the efficiency in recognizing an error (in units of a block) and in retransmitting packets (in units of a block) by managing packets in units of a block, which is composed of a plurality of packets, at a receiving side.

According to the art disclosed in the Japanese Unexamined Patent Publication No. 10-70523, the efficiency in retransmission is improved. However, because of the inclusion of the retransmission procedure, when motion picture data is transmitted from a transmitting side to a receiving side, an event where part of the motion picture received by the receiving side is lost occurs. This poses a problem in that the motion picture may stop or become hard to view.

According to the art disclosed in the Japanese Unexamined Patent Publication No. 10-308932, similarly to the Japanese Unexamined Patent Publication No. 10-70523, when a transmitting side retransmits data, a motion picture received by a receiving side may temporarily stop.

SUMMARY OF THE INVENTION

Accordingly, an object of the present invention is to provide a recovery system for restoring preserved regeneration data that enables listening and viewing according to restored regeneration data. In the recovery system, a receiving side regenerates data in real time without stopping a motion picture irrespective of whether an error packet or a data from which a packet has been lost is present. During the regeneration, the receiving side compensates for an error or for a loss of a packet in data stored in a storage device in the receiving side.

In order to accomplish the above object, according to the first aspect of the present invention, there is provided a receiver that recovers regeneration data using a backup. The receiver includes a retransmission request unit that transmits retransmission request information, which specifies a packet identifier (hereinafter ID) indicating a packet to be reloaded, to a transmitter. Data contained in a packet retransmitted from the transmitter is overwritten on corresponding data stored in a storage device.

Consequently, the receiver can preserve regeneration data without suspending regeneration. Moreover, even if an error packet or a data from which a packet has been lost is found, the necessary packet alone is retransmitted, and correct data is stored in the storage device. Therefore, if stored data is regenerated, correct data can be regenerated.

According to the second aspect of the present invention, there is provided a transmitter that transmits data to a receiver in units of a packet. The transmitter retransmits only a packet, which is identified with a packet ID specified in reload request information sent from the receiver, to the receiver.

Consequently, the transmitter need not preserve all transmitted data. This leads to a saving of hardware resources.

According to the third aspect of the present invention, there is provided a recovery system for restoring preserved regeneration data. The recovery system consists mainly of a receiver and a transmitter. The receiver includes: a data regeneration mechanism that receives data in units of a packet and regenerates the received data; a storage device in which the received data is stored; a packet ID extraction unit that extracts a packet ID indicating a packet to be re-received; and a retransmission request unit that transmits retransmission request information, which specifies a packet ID indicating a packet to be re-received, to the transmitter. The transmitter retransmits only a packet, which is identified with the packet ID specified in the retransmission request information sent from the receiver, to the receiver. The receiver overwrites data stored in the storage device with data contained in a packet retransmitted from the transmitter.

According to the fourth aspect of the present invention, preferably, the transmitter included in the recovery system in accordance with the third aspect has a buffer memory in which part of data to be transmitted is sequentially and temporarily held. The buffer memory has a size permitting the buffer memory to keep holding one transmitted packet during a predetermined time from the transmission of the one packet to the arrival of the retransmission request information from the receiver. Each packet held in the buffer memory is overwritten with a packet that will be newly transmitted after the elapse of the predetermined time.

According to the fifth aspect of the present invention, there is provided a recovery system for restoring preserved regeneration data. The recovery system consists mainly of a transmitter that transmits data in units of a packet and a receiver that receives data from the transmitter in units of a packet. The transmitter includes an interface through which data is transmitted to the receiver in conformity with a protocol stipulating no retransmission procedure, and a first storage device in which transmitted data is stored. The receiver includes: a packet ID extraction unit that extracts a packet ID indicating a packet to be retransmitted from data that is received from the transmitter in conformity with the protocol stipulating no retransmission procedure; a second storage device in which a packet ID indicating a packet to be retransmitted and being extracted by the packet ID extraction unit is stored; a regeneration unit that regenerates received data; a third storage device in which the received data is stored; and a retransmission setting unit that transmits a packet ID, which indicates a packet to be re-received and is stored in the second storage device, to the transmitter in conformity with a protocol stipulating a retransmission procedure after reception of data. The transmitter reads a packet, which is identified by the packet ID that indicates a packet to be retransmitted and that is transmitted from the retransmission setting unit, from the first storage device. The transmitter then transmits the read packet to the receiver in conformity with the protocol stipulating a retransmission procedure. The receiver overwrites data, which is identified with the packet ID indicating a packet to be re-received and is stored in the third storage device, with data identified with the packet ID indicating a packet to be re-received and being sent from the transmitter.

Consequently, the receiver receives data in conformity with the protocol stipulating no retransmission procedure and regenerates the data. Consequently, data can be regenerated in real time without the necessity of stopping a motion picture. Moreover, a packet to be reloaded is received in conformity with the protocol stipulating a retransmission procedure. A packet to be re-received can be received reliably. Moreover, a data synthesizer produces correct data all the time. Consequently, listening and viewing are enabled in nearly real time according to data that includes correct image data and is devoid of an error or a loss.

According to the present invention, there is provided a program that instructs a computer to implement a method and a procedure according to which a receiver operates.

DESCRIPTION OF THE PREFERRED EMBODIMENTS

Embodiments of the present invention will be described, in conjunction with the drawings, below.

Figure 1:
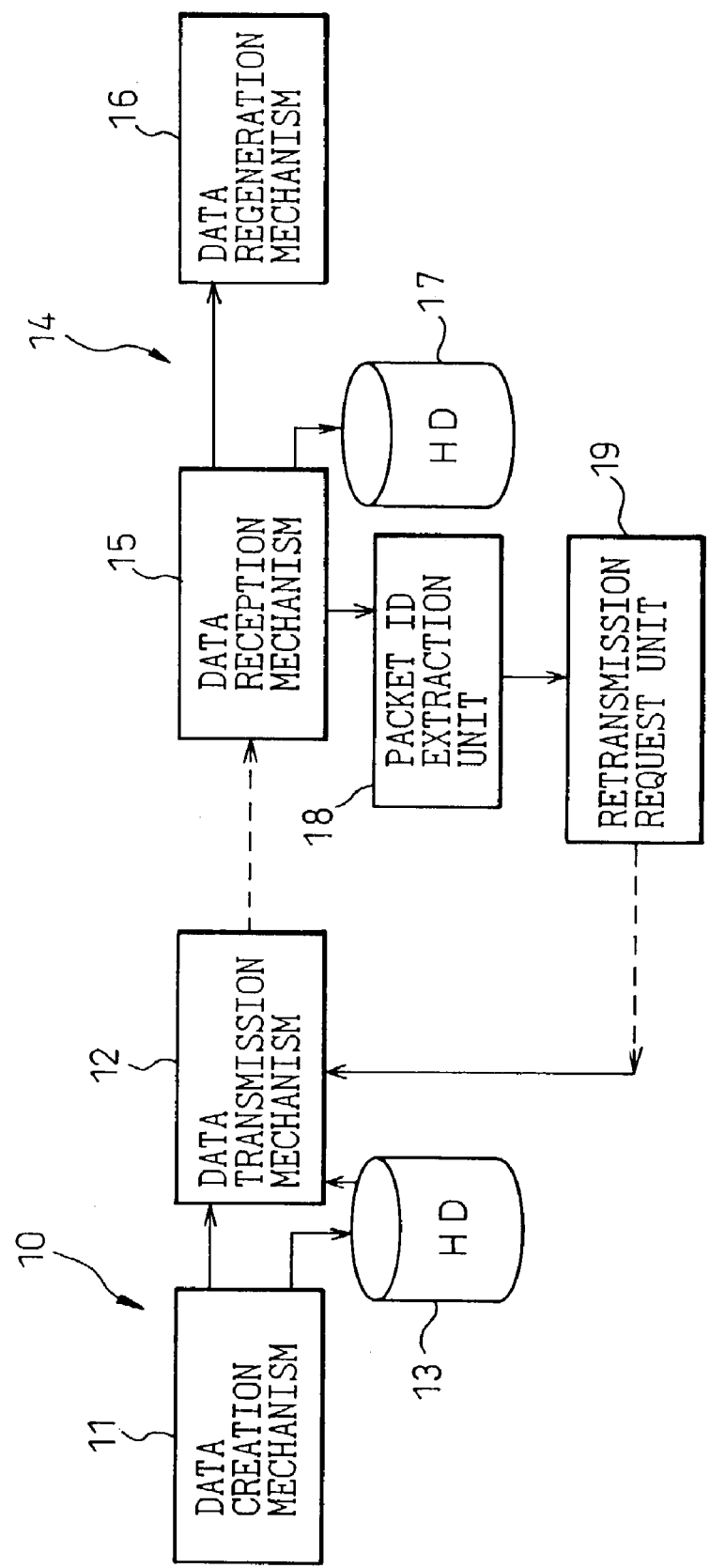
FIG. 1 is a block diagram showing the configuration of a recovery system for restoring preserved regeneration data in accordance with a first embodiment of the present invention.

FIG. 1 is a block diagram showing the configuration of a recovery system for restoring preserved regeneration data in accordance with a first embodiment of the present invention. Referring to FIG. 1, the recovery system consists mainly of a transmitter (hereinafter referred to as a server 10) and a receiver (hereinafter referred to as a client 14). The server 10 includes a data creation mechanism 11, a data transmission mechanism 12, and a storage device (hard disk HD) 13. The client 14 includes a data reception mechanism 15, a data regeneration mechanism 16, a storage device (hard disk HD) 17, a packet ID extraction unit 18, and a reload request unit 19.

Next, the operation of the system shown in FIG. 1 will be described below.

In the server 10, the data creation mechanism 11 creates data in units of a packet using real-time data produced by a video camera or a microphone or existing data stored on a digital versatile (or video) disk (DVD) or a tape recorder. Image data and/or audio data created by the data creation mechanism are recorded in the storage device 13. The data transmission mechanism 12 transmits the data created by the data creation mechanism 11 or the data stored in the storage device 13 in units of a packet.

In the client 14, the data reception mechanism 15 receives data from the server 10 in units of a packet. The data regeneration mechanism 16 regenerates the data contained in each of packets transferred from the data reception mechanism 15, and displays an image according to the data. The output of the data reception mechanism 15 is stored as regeneration data in the storage device 17. Even if an error has occurred in a received packet or even if a packet has lost from the received data, some data is stored in an area allocated to the packet. The packet ID extraction unit 18 extracts a packet identifier (ID) indicating a packet that must be re-received because an error has occurred in the data received by the data reception mechanism 15 or because a packet has lost from the received data. The retransmission request unit 19 transmits retransmission request information, which specifies a packet ID indicating a packet which must be retransmitted, to the data transmission mechanism 12 included in the server 10.

The data transmission mechanism 12 retransmits only a packet, which is identified with the packet ID specified in the retransmission (reload) request information sent from the retransmission (reload) request unit 19, to the data reception mechanism 15 included in the client 14. The data reception mechanism 15 overwrites a corresponding packet stored in the storage device 17 with a packet retransmitted from the data transmission mechanism 12.

Consequently, the data regeneration mechanism 16 regenerates in real time data received from the server 10. At the same time, correct data devoid of an error or a loss stemming from transmission performed in units of a packet is stored in the storage device 17. The stored data is therefore restored efficiently.

Figure 2:
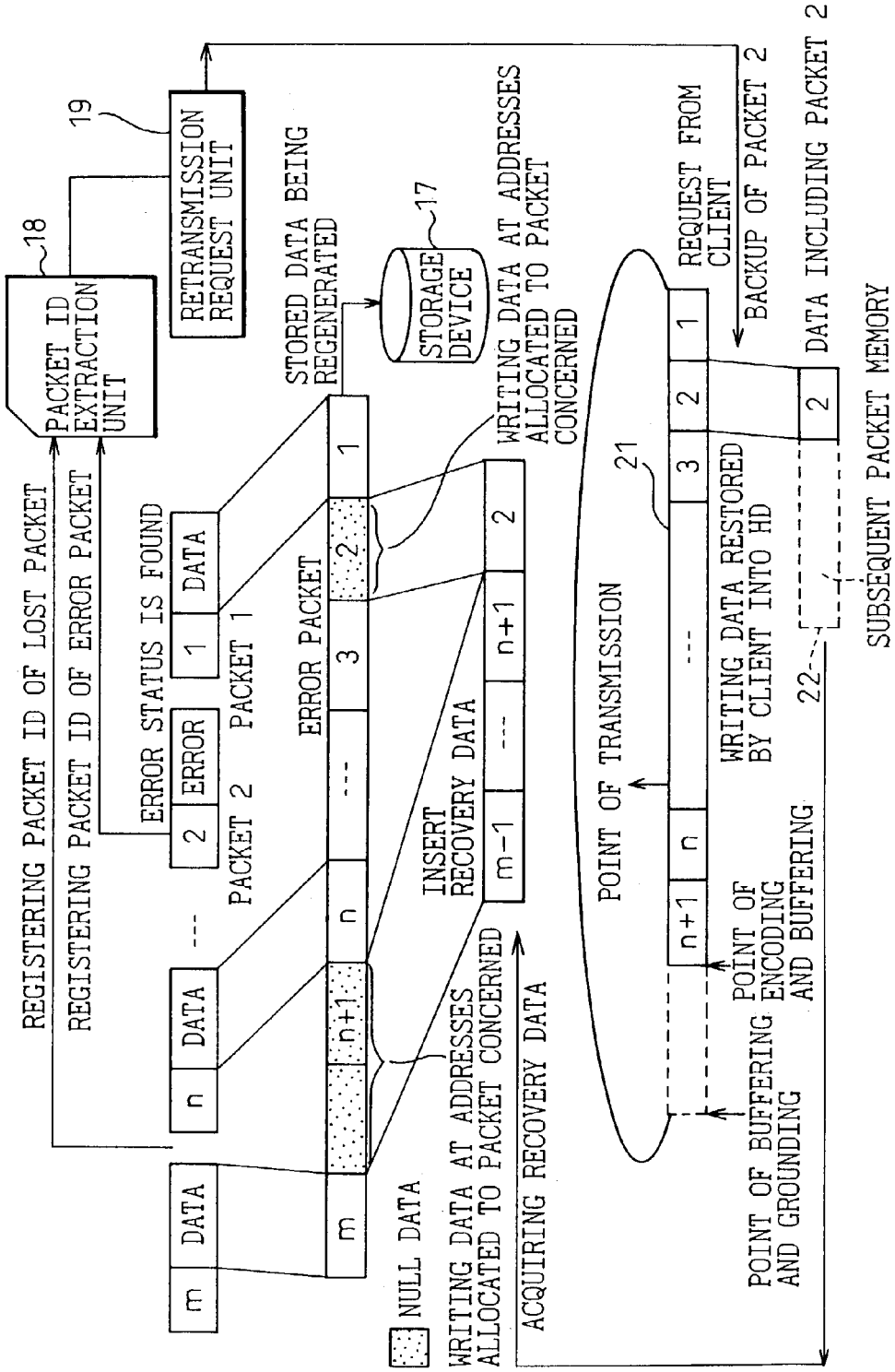
FIG. 2 shows the first example of the system configuration employed in the first embodiment.

FIG. 2 shows a first example of the system configuration employed in the first embodiment. In this example, transmitted data is not recorded in the storage device 13 included in the server 10. The data reception mechanism 15 receives data in units of a packet, that is, receives packets 1 to m. In the illustrated example, packet 2 is an error packet, and packets (n+1) to (m−1) are lost packets. Null data is written in areas in the storage device 17 allocated to the error packet and the lost packets. The null data may be any data with which the areas allocated to the packets are filled. Namely, an error may be stored as it is or all-zero data may be stored. The ID of the error packet and the IDs of the lost packets are extracted by the packet ID extraction unit 18. The retransmission request unit 19 requests the data transmission mechanism 12 included in the server 10 to retransmit packets identified with the extracted packet IDs.

The data transmission mechanism 12 includes a buffer memory 21 in which part of data to be transmitted is sequentially temporarily held, and a subsequent packet memory 22 in which packets to be retransmitted are accumulated. The buffer memory has a size permitting the buffer memory to keep holding one transmitted packet during a predetermined time from the transmission of the one packet to the arrival of a retransmission request issued from the retransmission request unit 19 included in the client 14. Each packet in the buffer memory 21 is overwritten with a packet to be newly transmitted after the elapse of the predetermined time. When a retransmission request arrives, a packet identified with a packet ID specified in the request is copied from the buffer memory 21 to the subsequent packet memory 22 and is thus accumulated together with the packet ID in the subsequent packet memory 22. The contents of the subsequent packet memory 22 are transmitted to the client 14 according to proper timing. The client 14 acquires the subsequent packet as a recovery packet, and overwrites the null packet, which is stored in the storage device 17, with the recovery packet. The proper timing of transmitting data to be retransmitted may be the time within an available time during data transmission or the time after transmission of one video data.

Thus, restored data is stored in the storage device 17 included in the client 14. Correct data, devoid of an error or a loss, stemming from transmission performed in units of a packet, can therefore be regenerated.

Figure 3:
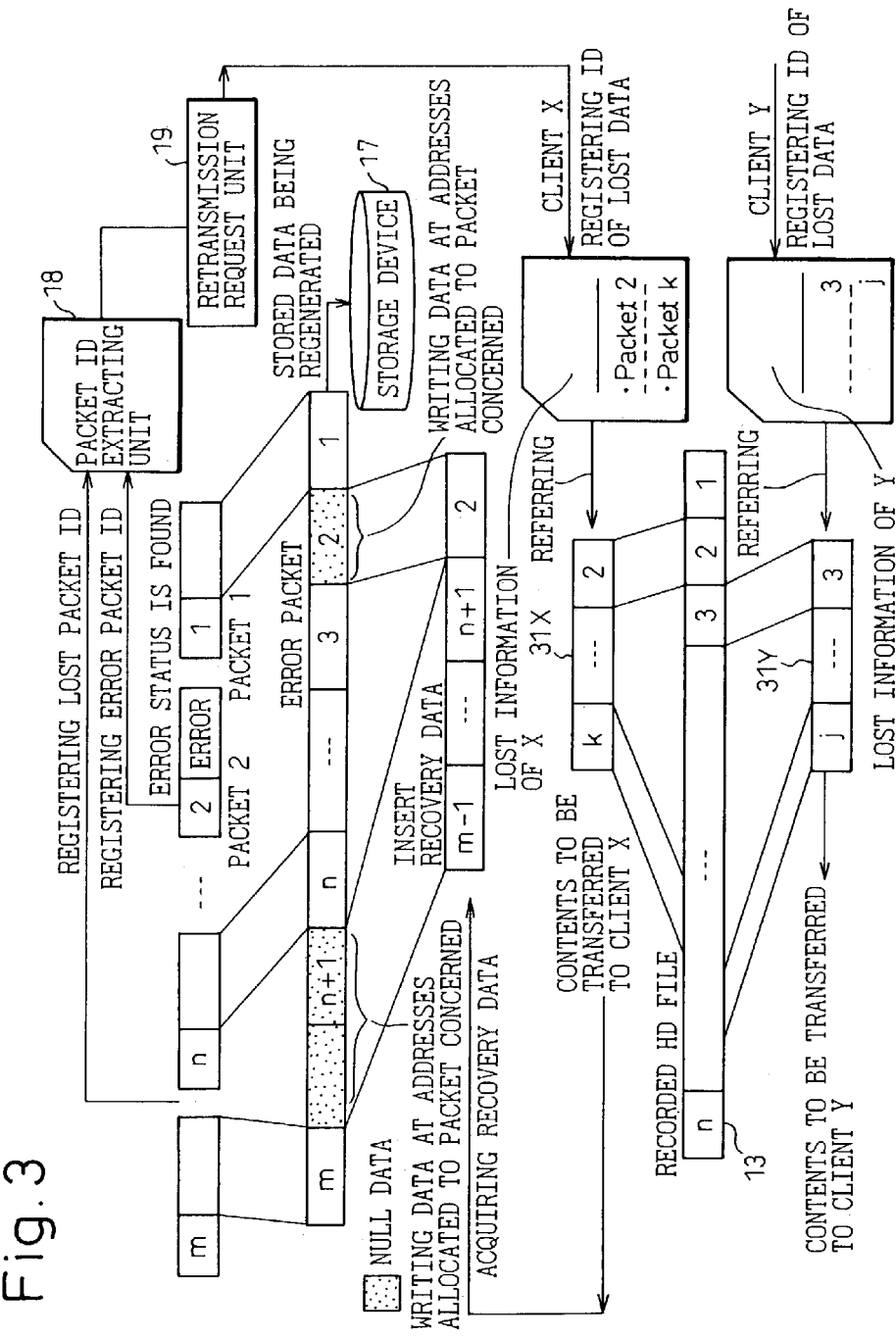
FIG. 3 shows the second example of the system configuration employed in the first embodiment.

FIG. 3 shows the second example of the system configuration employed in the first embodiment. In this example, all of data to be transmitted from the server is preserved in the storage device 13. Moreover, if a plurality of clients X and Y is present, memories 31X and 31Y associated with the clients are included in the server. Only a packet identified with a packet ID specified in retransmission request information sent from a receiver included in the client X is stored in the memory 31X associated with the client X. The packet is read from the memory 31X and retransmitted to the client X according to proper timing in the same manner as it is shown in FIG. 2. Similarly to the client included in the example shown in FIG. 2, the client X acquires the packet as a recovery packet, and overwrites a null packet stored in the storage device 17 with the recovery packet.

In response to a retransmission request issued from the client Y, only a packet identified with a packet ID specified in reload request information is stored in the memory 31Y. The packet is read from the memory 31Y and then retransmitted to the client Y.

The same applies to the case where a client Z and other clients that are not shown are present in addition to the clients X and Y. Namely, memories are included to be associated with the clients.

Consequently, even if a plurality of clients is present, a necessary packet should merely be copied from the storage device 13 to an associated memory. Thus, the contents of a storage device included in each client can be restored efficiently.

Figure 4:
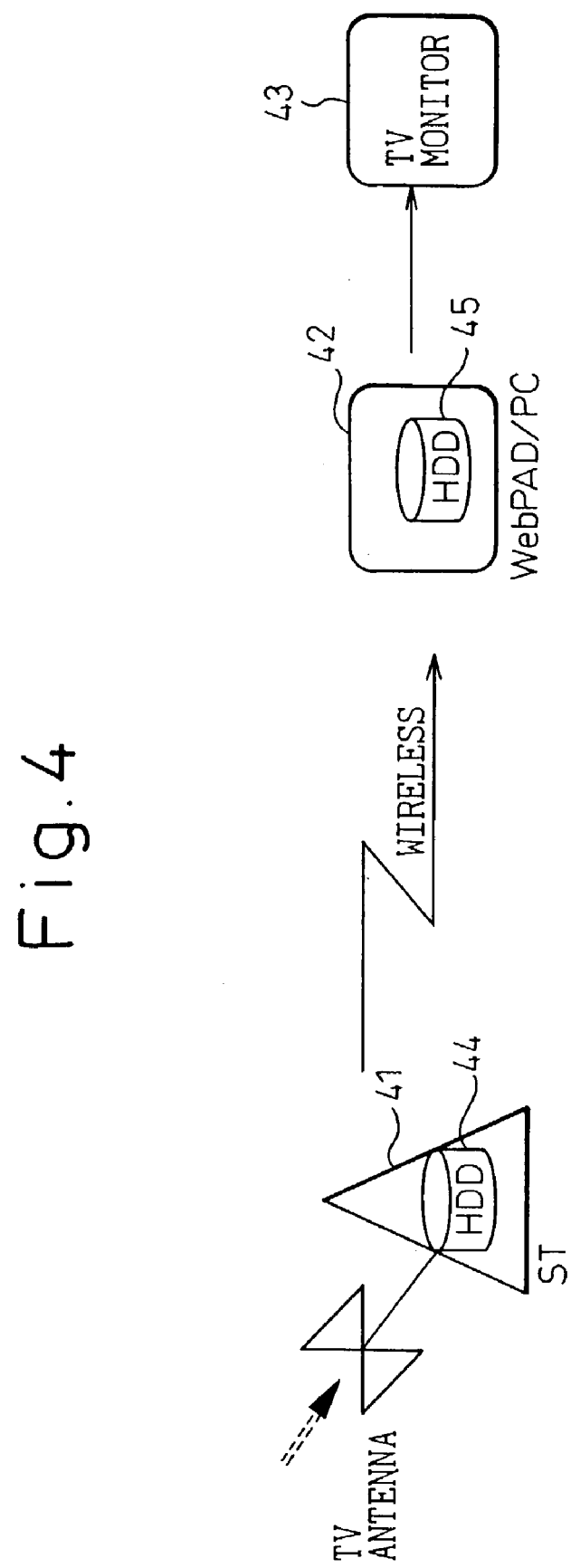
FIG. 4 is a block diagram showing the outline configuration of a recovery system for restoring preserved regeneration data in accordance with a second embodiment of the present invention.

FIG. 4 is a block diagram showing the outline configuration of a recovery system for restoring preserved regeneration data in accordance with a second embodiment of the present invention.

Referring to FIG. 4, the system consists mainly of a station (ST) 41 serving as a server (hereinafter a server 41), a home-use simple Internet terminal (Web pad) or a personal computer 42 serving as a client (hereinafter a client 42), and a TV monitor 43. The server 41 acts as an access point on a wireless LAN and includes a TV tuner, a hard disk, and a motion picture encoder. The server 41 transmits a television signal to the client 42 by radio. The client 42 enjoys television broadcasting on the TV monitor 53 connected thereto. The server 41 includes a hard disk (HDD) 44. When a transmitted television signal is recorded in the hard disk 44, the server 41 is used as a personal video recorder (PVR). Likewise, the client 42 includes a hard disk 45. When a received television signal is recorded in the hard disk 45, the client 42 is used as a personal video recorder (PVR).

The server 41 encodes a television video signal, and transmits the resultant signal to the client 42 by radio. The client 42 decodes the received signal and displays a television picture on the TV monitor 43.

The client 42 is normally a portable machine such as a Web pad or a personal computer. The client 42 can be readily moved in order to watch television.

The system has drawbacks described below.

(1) As the system is a wireless system, there is a high possibility that data may be lost.

(2) As a motion picture is transmitted, a certain number of frames (for example, 30 frames per sec) must be attained per unit time.

(3) As a motion picture is transmitted, the amount of data to be manipulated is large. Moreover, if an attempt is made to transfer a file while watching television, it takes much time to transfer a file.

In consideration of the above drawbacks, the following requirements for the system must be satisfied:

(1) It should be possible to watch television in real time.

(2) Video data should be preserved in the client 42.

The description given in conjunction with FIG. 4 may be applied to the first embodiment described in conjunction with FIG. 1 to FIG. 3.

In order to make it possible to watch television in real time, a certain number of frames must be attained per unit time. For this reason, a protocol stipulating no retransmission procedure (for example, a user datagram protocol (UDP)) should be adopted. However, in order to preserve video data in the client 42, a protocol stipulating a retransmission procedure (for example, a transfer control protocol (TCP)) should be adopted as a protocol capable of guaranteeing data.

After data is transmitted in conformity with a protocol stipulating no retransmission procedure, if backup data is transmitted in conformity with a protocol stipulating a retransmission procedure, it takes much time to transfer a file.

According to the present embodiment, the above problem is resolved by adopting any of techniques implemented in example 1 to example 3 of the present embodiment.

Figure 5:
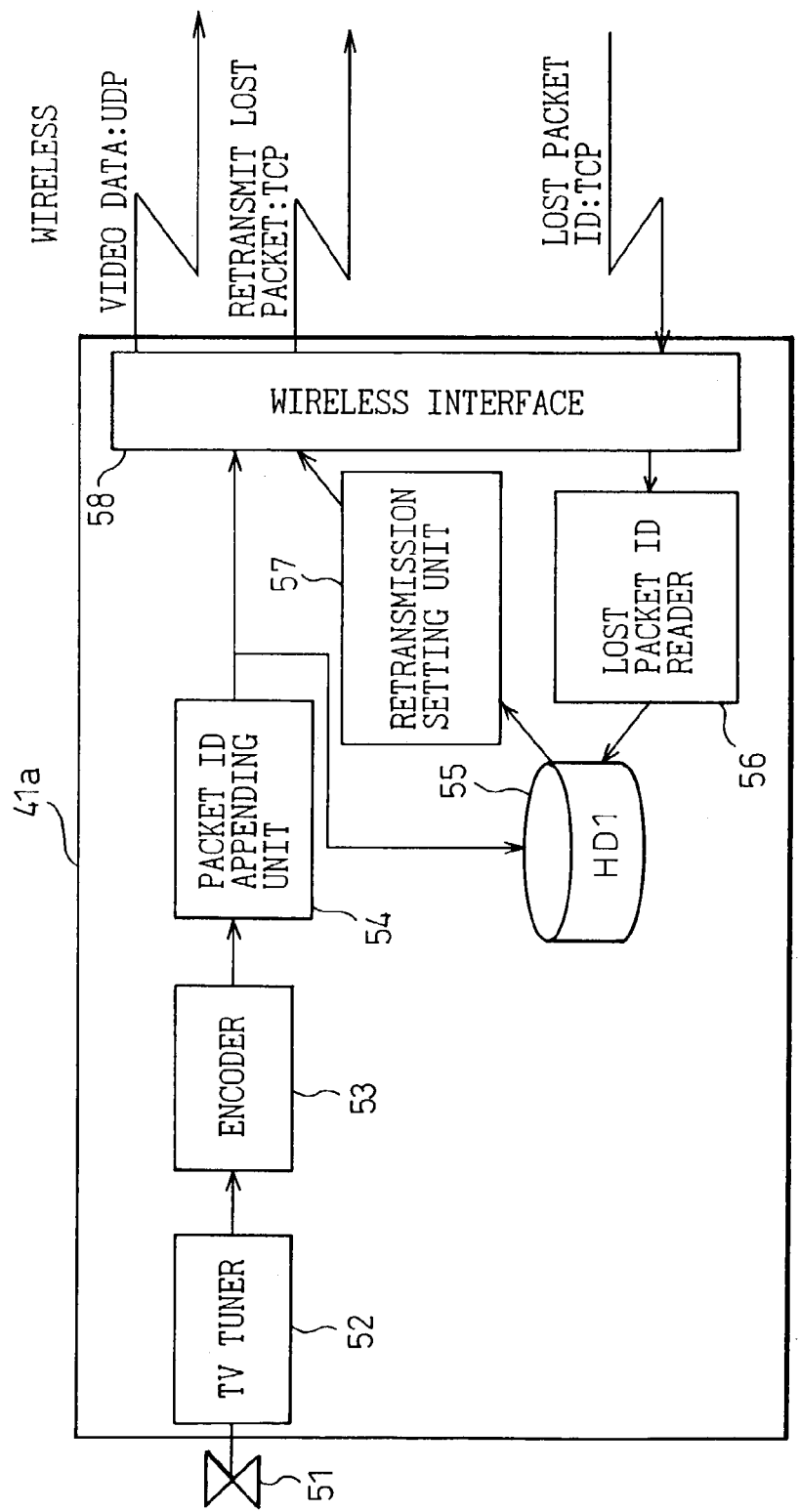
FIG. 5 is a block diagram showing the configuration of a server included in the first example of the second embodiment of the present invention.

FIG. 5 is a block diagram showing the configuration of a server included in example 1 of the second embodiment of the present invention. Referring to FIG. 5, a server 41a consists mainly of a TV tuner 52, an encoder 53, a packet ID appending unit 54, a first storage device (hard disk (HD1)) 55, a lost packet ID reader 56, a retransmission setting unit 57, and a wireless interface 58. The TV tuner 52 selects a desired signal component from a signal received through a TV antenna 51. The encoder 53 encodes the selected signal component. The packet ID appending unit 54 produces a packet containing the encoded signal, and appends a serial number as a packet ID to the packet. Transmitted data is preserved in the first storage device 55.

Figure 6:
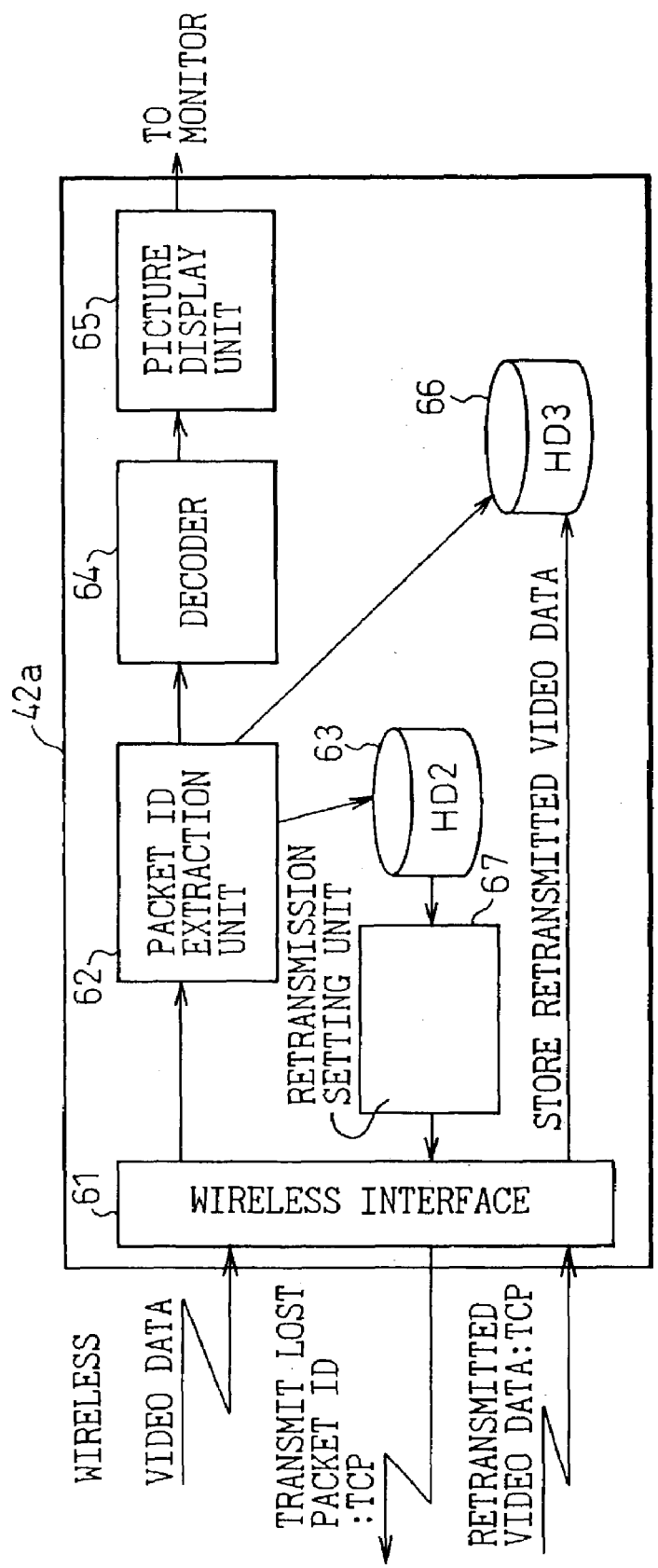
FIG. 6 is a block diagram showing the configuration of a client included in the first example of the second embodiment of the present invention.

FIG. 6 is a block diagram showing the configuration of a client included in example 1 of the second embodiment of the present invention. Referring to FIG. 6, a client 42a consists mainly of a wireless interface 61, a packet ID extraction unit 62, a second storage device (HD2) 63, a decoder 64, a video display unit 65, a third storage device (HD3) 66, and a retransmission setting unit 67. The packet ID extraction unit 62 extracts a lost packet ID. The packet ID of a lost packet extracted by the packet ID extraction unit 62 is stored in the second storage device 63. The decoder 64 decodes received data. The received data is stored in the third storage device 66. The retransmission setting unit 67 transmits the packet ID of the lost packet, which is stored in the second storage device 63, to the transmitter in conformity with a protocol stipulating a retransmission procedure after reception of data.

Next, the operation of the system including the server and client shown in FIG. 5 and FIG. 6 respectively will be described below.

At the server 41a, the TV tuner 52 selects a desired frequency component from a signal received through the TV antenna 51. The encoder 53 encodes the frequency component into a digital signal. The packet ID appending unit 54 produces a packet containing the digital signal and appends a packet ID to the packet. The packet ID is a serial number to be assigned in order to a received packet. However, the packet ID is not limited to the serial number but may be any identification code. The packet having the packet ID appended thereto is transmitted to the client 42a via the wireless interface 58 in conformity with a protocol stipulating no retransmission procedure, that is, the UDP. The UDP is adopted as the protocol because TCP is unsuitable. Namely, if the TCP is adopted, a retransmission procedure of retransmitting a backup of a lost packet must be included. Therefore, when a motion picture must be transmitted at a predetermined speed of a predetermined number of frames per unit time, the predetermined number of frames cannot be transmitted during the unit time.

In the client 42a shown in FIG. 6, video data received in conformity with the UDP is transferred to the packet ID extraction unit 62 via the wireless interface 61. It is then checked whether a packet to be re-received, such as a lost packet or an error packet (the lost packet refers to a packet that must be reloaded), is present. Independently of the checking of whether the lost packet is present, a received packet is decoded by the decoder 64, and converted into a video signal by the video display unit 65. Consequently, a motion picture is displayed on the monitor. Since the UDP is a protocol stipulating no retransmission procedure, a motion picture represented by video data transmitted from the server 41a is displayed on the monitor nearly in real time.

On the other hand, when a packet to be re-received is detected, the packet ID of the packet is stored in the second storage device 63. The retransmission setting unit 67 transmits the packet ID to the server 41a via the wireless interface 61 in conformity with the TCP.

Independently of extraction of a lost packet, a received packet is stored as it is in the third storage device (HD3) 66.

In the server 41a, the lost packet ID reader 56 receives a lost packet ID from the client 42a in conformity with the TCP, and reads a packet identified with the lost packet ID from the first storage device 55. The read packet is transmitted to the client 42a via the retransmission setting unit 57 and wireless interface 58 in conformity with the TCP.

In the client 42a, a packet identified with the lost packet ID and stored in the third storage device (HD3) is overwritten with the received packet.

Thus, both transmission of a motion picture in conformity with the UDP and transmission thereof in conformity with the TCP are utilized. While watching television is permitted without stoppage of a motion picture, data devoid of a loss or an error can be stored in the third storage device 66. Consequently, when the data stored in the third storage device 66 is regenerated later, a normal motion picture and sound can be enjoyed. After transmission is performed in conformity with the UDP, if transmission is performed in conformity with the TCP, a time corresponding to the sum of an UDP transmission time and a TCP transmission time is needed.

For example, assuming that a movie is one hour long, a processing time is 2.1 hours calculated by summing up one hour and 1.1 hours (because of retransmission).

In contrast, in example 1 of the present embodiment, a processing time is 1.1 hours calculated by summing up the UDP transmission time and a retransmission time.

According to the art described in the Japanese Unexamined Patent Publication No. 10-70523, a processing time is 1.1 hours calculated by summing up a transmission time and a retransmission time. Since transmission and retransmission are performed nearly concurrently, a motion picture may stop temporarily.

The foregoing processing times are listed below.

TABLE 1

Estimated processing times for a motion picture of one hour long

| | Processing time | Merit and demerit |
| --- | --- | --- |
| Related art | UDP transmission time + TCP transmission time = 1 hour + 1.1 hour | Display screen: uninterrupted Time: long |
| Known art | UDP transmission time + unprecedented retransmission time = 1 hour + 0.1 hour (retransmission time) | Display screen: interrupted Time: short |
| Present embodiment (example 1) | UDP transmission time + unique retransmission time = 1 hour + 0.1 hour (retransmission time) | Display screen: uninterrupted Time: short |

By appropriately setting the retransmission setting unit 57 shown in FIG. 5 and/or the retransmission setting unit 67 shown in FIG. 6, a user can designate whether a packet identified with a lost packet ID should be retransmitted.

Figure 7:
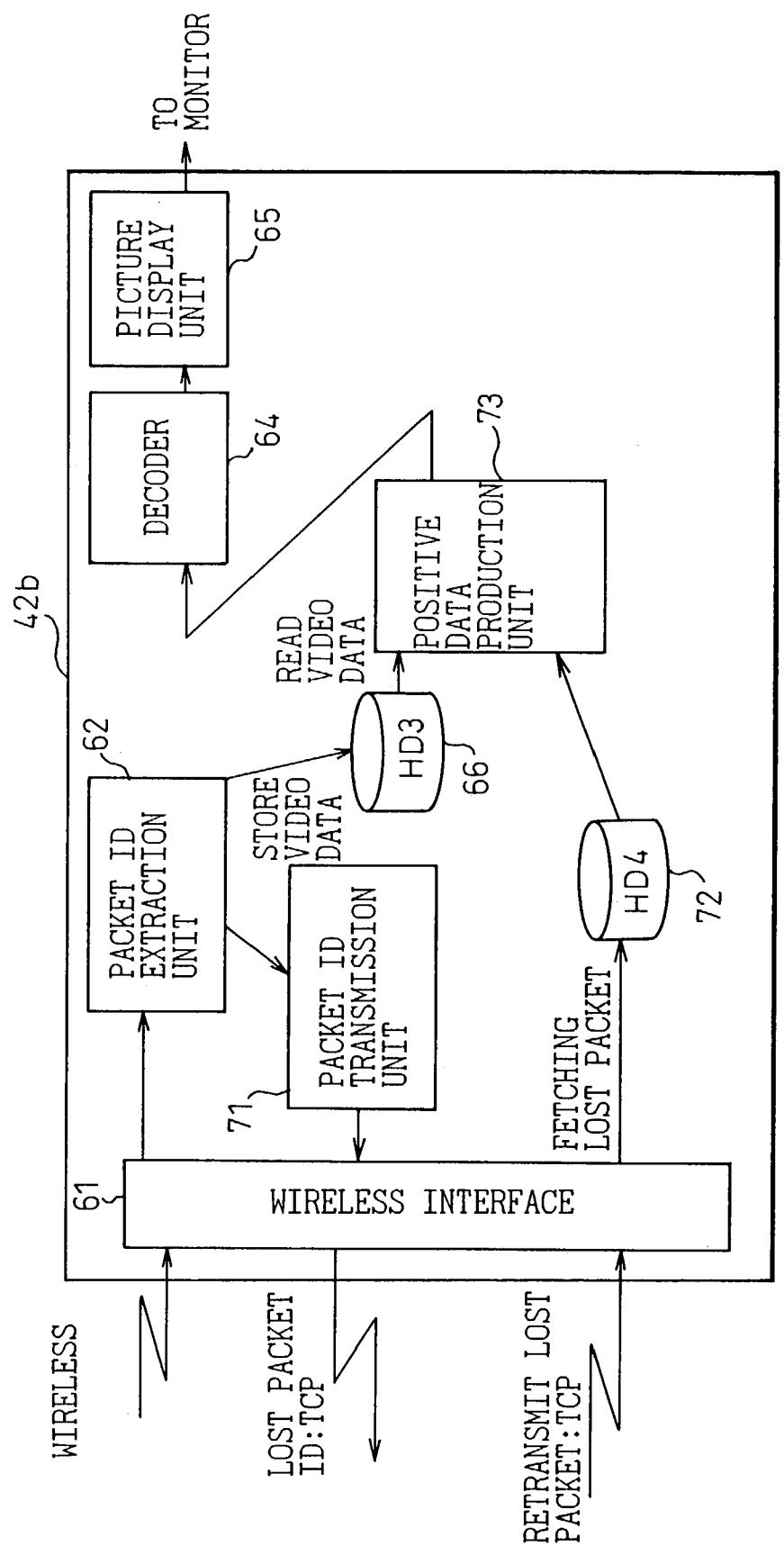
FIG. 7 is a block diagram showing the configuration of a client included in the second example of the second embodiment of the present invention.

FIG. 7 is a block diagram showing the configuration of a client included in example 2 of the second embodiment of the present invention. Referring to FIG. 7, the same reference numerals are assigned to components identical to those of the client included in example 1 shown in FIG. 6. In this example, a client 42b consists mainly of a packet ID transmission unit 71, a fourth storage device (HD4) 62, and a correct data production unit 73. The packet ID transmission unit 71 transmits the ID of a lost packet to the server in conformity with the TCP. A packet identified with the lost packet ID is fetched and stored in the fourth storage device 72. The correct data production unit 73 synthesizes an output of the third storage device 66 and an output of the fourth storage device 72 so as to produce correct data. The configuration of the server included in example 2 is identical to the one included in example 1 and shown in FIG. 5.

Next, the operation of a recovery system for restoring preserved regeneration data in accordance with example 2 will be described below.

Transmission of a packet from the server to the client 42b is identical to that in example 1. The packet ID transmission unit 71 transmits the ID of a lost packet extracted by the packet ID extraction unit 62 to the server via the wireless interface 61 in conformity with TCP. The server having received the lost packet ID retransmits a packet identified with the lost packet ID in conformity with TCP in the same manner as it does in example 1. The packet identified with the lost packet ID is stored in the fourth storage device (HD4) 72.

The correct data production unit 73 synthesizes an output of the third storage device 66 and an output of the fourth storage device 72 and transfers the resultant correct data to the decoder 64. The decoder 64 decodes the data into an analog signal. The video display unit 65 transfers the analog signal to the monitor.

According to the foregoing example 2, compared with example 1, as no data is lost, the image quality discerned on the monitor will not deteriorate. However, before a motion picture is displayed on the monitor, transmission of a lost packet ID in conformity with the TCP and transmission of the lost packet in conformity with the TCP are carried out concurrently. Therefore, a short time lag occurs.

Figure 8:
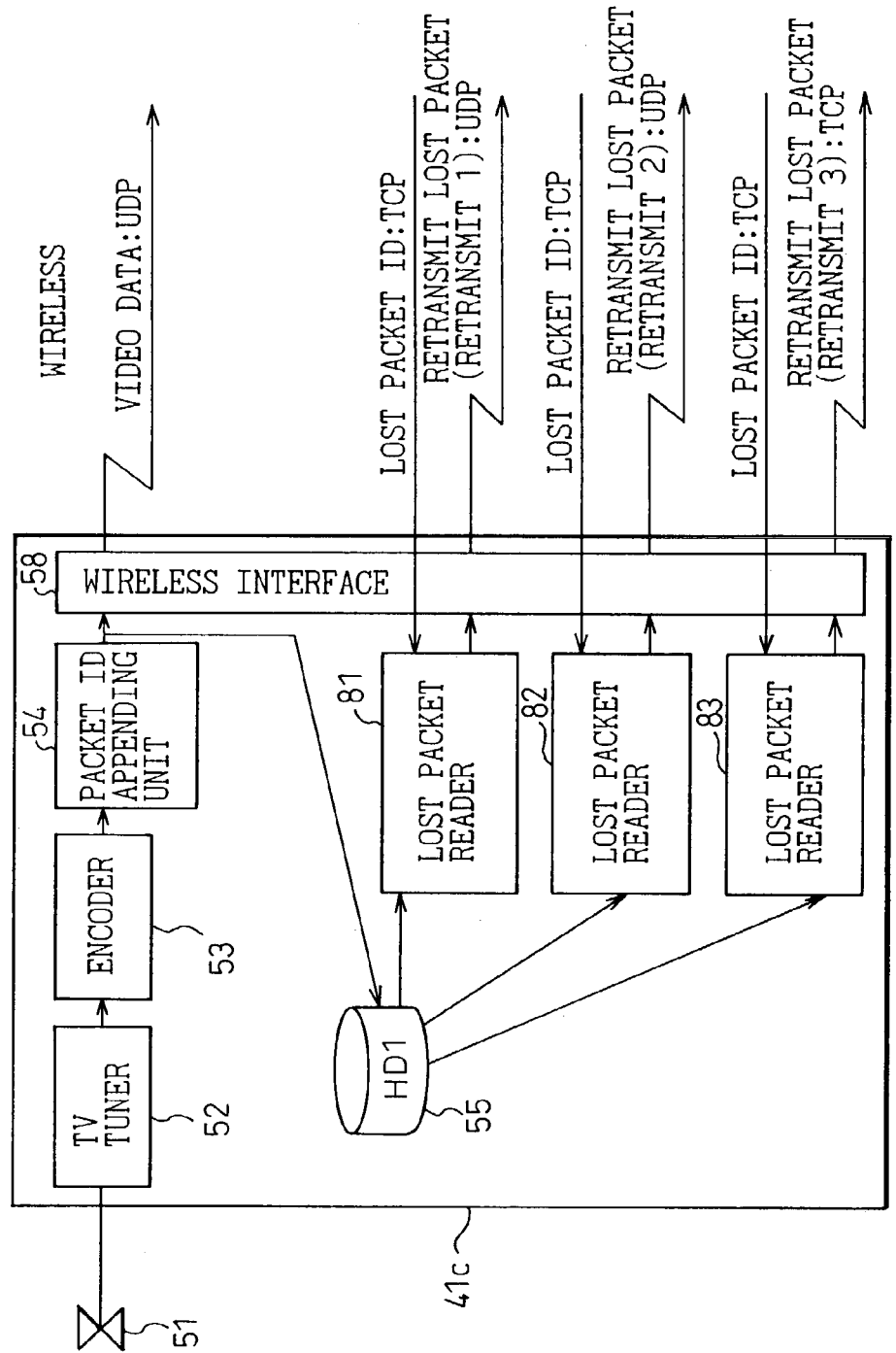
FIG. 8 is a block diagram showing the configuration of a server 41c included in the third example of the second embodiment of the present invention.

FIG. 8 is a block diagram showing the configuration of a server 41c included in example 3 of the second embodiment of the present invention. Referring to FIG. 8, the same reference numerals are assigned to components identical to those shown in FIG. 5. In this example, the client 41c includes a plurality of lost packet readers 81, 82, and 83 so that a plurality of lost packet IDs can be received from the client in conformity with TCP. Herein, every time a lost packet ID is received from the client, a packet identified with the lost packet ID is read from the first storage device (HD1) 55 and transmitted to the client. In the illustrated example, the number of lost packet readers is 3. The number of lost packet readers may be set to any required value. Transmitting a packet identified with a lost packet ID to the client is performed in conformity with UDP except for transmission of a packet identified with the last lost packet ID. The packet identified with last lost packet ID alone is transmitted to the client in conformity with the TCP.

Figure 9:
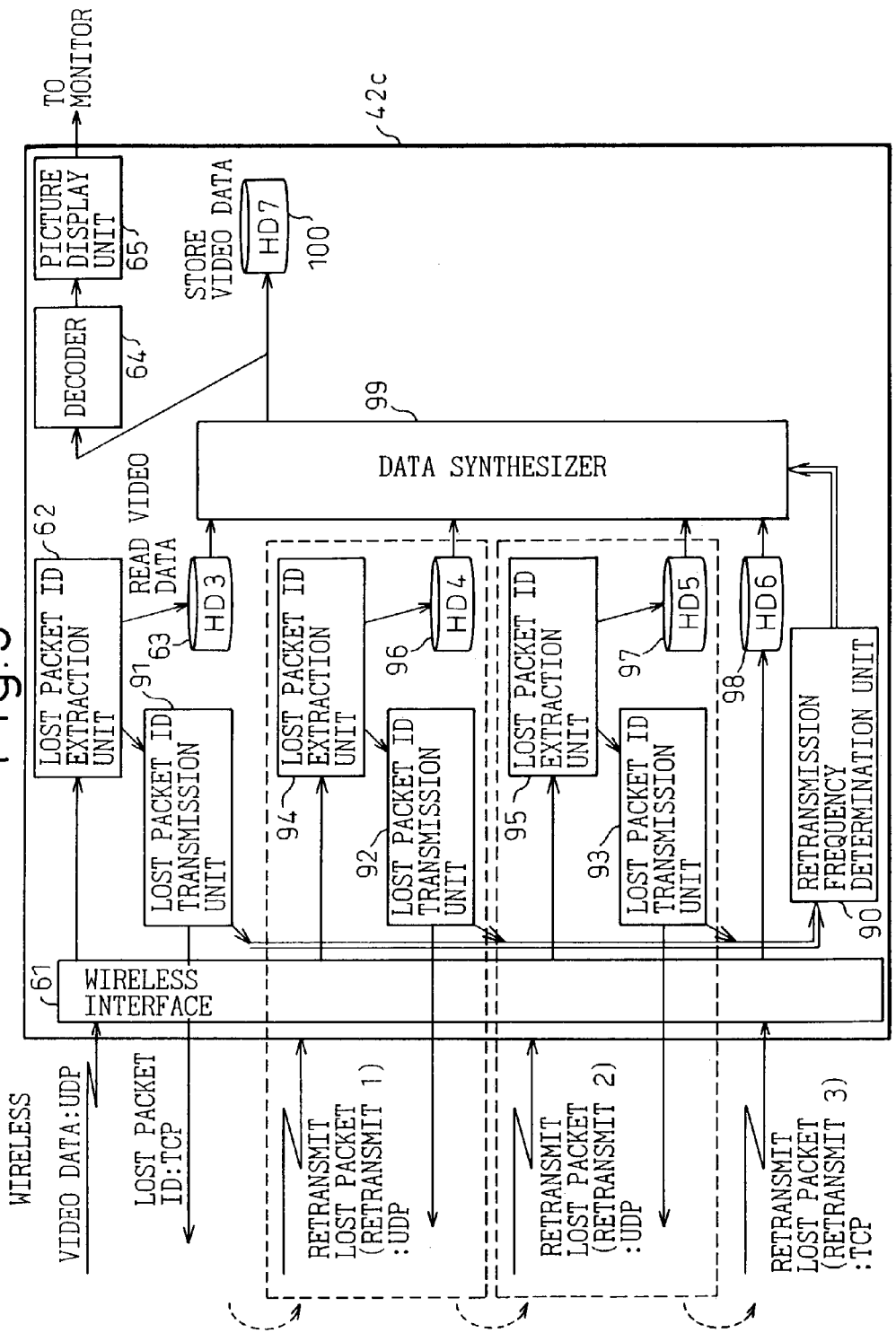
FIG. 9 is a block diagram showing the configuration of a client 42c included in the third example of the second embodiment of the present invention.

FIG. 9 is a block diagram showing the configuration of a client 42c included in example 3 of the second embodiment of the present invention. Referring to FIG. 9, the same reference numerals are assigned to components identical to those shown in FIG. 7. The client 42c included in example 3 has a plurality of lost packet ID extraction units 62, 94, and 95, a retransmission frequency determination unit 90, a plurality of lost packet ID transmission units 91, 92, and 93, a plurality of lost packet storage devices 96, 97, and 98, and a data synthesizer 99. The retransmission frequency determination unit 90 determines the number of times of retransmission, by which the server is requested to retransmit a packet identified with a lost packet ID, according to an error rate or a lost packet occurrence rate detected from data received in conformity with the UDP. The plurality of lost packet ID transmission units 91, 92, and 93 detects the same number of packet IDs indicating packets to be reloaded as the number of times determined by the retransmission frequency determination unit 90. The plurality of lost packet ID transmission units 91, 92, and 93 then transmits the detected packet IDs to the transmitter in conformity with a protocol stipulating a retransmission procedure. The same number of packets, which are identified with the lost packet IDs and sent from the server, as the number of times determined by the retransmission frequency determination unit 90, is fetched and stored in the plurality of lost packet storage devices 96, 97, and 98. The data synthesizer 99 synthesizes an output of a received data storage device 63 with outputs of the plurality of lost packet storage devices 96, 97, and 98 so as to produce correct data.

Next, the operation of the system, including the server and client shown in FIG. 8 and FIG. 9 respectively, will be described below.

Video data having packet IDs appended thereto is transmitted from the server 41c to the client 42c in conformity with UDP. The client 42c receives the video data in conformity with UDP, and checks the packet IDs. The packet ID extraction unit 62 included in the client 42c detects whether a lost packet or an error packet is present, and transfers lost packet IDs to the packet ID transmission unit 91 of the first stage. The retransmission frequency determination unit 90 determines the number of times of retransmission on the basis of the output of the packet ID transmission unit 91. In the illustrated example, the number of times of retransmission is three. Depending on the judgment made by the retransmission frequency determination unit 90, the number of times of retransmission may be larger or smaller. The lost packet ID transmission unit 91 transmits the lost packet IDs to the server 41c in conformity with TCP. In the server 41c having received the lost packet IDs, the lost packet reader 81 reads packets, which are identified with the lost packet IDs, from the first storage device 55 and retransmits the packets to the client 42c in conformity with UDP. The client 42c stores the retransmitted packets having the lost packet IDs in the fourth storage device (HD4) 96 via the second lost packet extraction unit 94.

On the other hand, the second lost packet ID extraction unit 94 judges whether the received packets having the lost packet IDs further include a lost packet. The retransmission frequency determination unit 90 re-determines the number of times of retransmission according to an output of the second lost packet ID extraction unit 94. Assume that it is determined that two more times of retransmission are needed. The second lost packet ID transmission unit 92 transmits lost packet IDs to the server 41c in conformity with the TCP. In the server 41c having received the lost packet IDS, the second lost packet reader 82 reads packets, which are identified with the lost packet IDs, from the first storage device 55, and retransmits the packets to the client 42c in conformity with UDP. The client 42c stores the retransmitted packets having the lost packet IDs in the fifth storage device (HD5) 97 via the third lost packet extraction unit 95.

On the other hand, the third lost packet ID extraction unit 95 judges whether the received packets having the lost packet IDs further include a lost packet. The retransmission frequency determination unit 90 re-determines the number of times of retransmission according to an output of the third lost packet ID extraction unit 95. If it is determined that one more time of retransmission is needed, the third lost packet ID transmission unit 93 transmits a lost packet ID to the server 41*c* in conformity with the TCP. In the server 41*c* having received the lost packet ID, the third lost packet reader 83 reads a packet, which is identified with the lost packet ID, from the first storage device 55, and retransmits the packet to the client 42*c* in conformity with TCP. The client 42*c* stores the retransmitted packet having the lost packet ID in the sixth storage device (HD6) 98.

As mentioned above, the last packet having the lost packet ID is retransmitted in conformity with TCP, and the other packets are transmitted in conformity with UDP.

The data synthesizer 99 synthesizes outputs of the third storage device (HD3) 63, fourth storage device (HD4) 96, fifth storage device (HD5) 97, and sixth storage device (HD6) 98 so as to produce correct video data. The video data is stored in a seventh storage device (HD7) 101. The decoder 64 decodes the video data into an analog signal, and the video display unit 65 transfers the analog signal to the monitor.

As mentioned above, according to example 3 of the second embodiment of the present invention that is a development of example 2, retransmission data (retransmission 1) is transmitted in conformity with UDP. When it is detected that some packets, in data transmitted in conformity with UDP, have been lost, retransmission of the packets (retransmission 2) is requested.

Furthermore, when it is detected that a packet in the data retransmitted during retransmission 2 has been lost, the packet is retransmitted (retransmission 3). Thus, retransmission in conformity with UDP is performed at a plurality of steps. At the last step, retransmission is performed in conformity with TCP.

Moreover, an amount of data to be retransmitted each time may be monitored in order to dynamically change the number of retransmission steps. If a large number of packets has lost, a delay time to be given to a video signal representing a motion picture (a buffering time in the HD3) is increased and the number of retransmission steps is increased. Thus, the losses can be compensated for.

According to example 2, retransmission in conformity with TCP is added. In contrast, according to example 3, lost data is compensated for by performing many retransmissions in conformity with UDP before performing retransmission in conformity with TCP. Consequently, the load to be incurred by a network can be reduced and a delay time can be shortened.

If the number of lost packets is small, a delay to be given to a video signal representing a motion picture by the HD3 (a buffering time in the HD3) is reduced and the number of retransmission steps is decreased. Consequently, the total delay time to be given to the video signal representing a motion picture can be shortened.

If the number of lost packets is negligible, retransmission to be performed in conformity with TCP may be omitted. Consequently, depending on the condition of a network, a delay time to be given to a video signal representing a motion picture and image quality can be automatically balanced. Moreover, priority levels assigned to the delay time and image quality can be varied arbitrarily and manually.

As is apparent from the above description, according to the present invention, there is provided a recovery system for restoring preserved regeneration data that enables viewing and listening using restored regeneration data. In the recovery system, a receiving side regenerates data without stopping a motion picture irrespective of whether an error packet or a lost packet is present. Meanwhile, the receiving side compensates for an error or a loss contained in data preserved in a storage device included therein.

The invention claimed is:

1. A receiver comprising:
    a received data storage device in which data received from a transmitter in accordance with a protocol including no retransmission procedure is stored;
    a retransmission frequency determination unit determining the number of times of retransmission, by which said transmitter is requested to retransmit a packet to be re-received, according to data received in accordance with the protocol including no retransmission procedure;
    a re-reception packet ID transmission unit detecting the same number of packet IDs, which indicate packets to be re-received, as the number of times determined by said retransmission frequency determination unit, and transmitting the packet IDs to said transmitter in accordance with a protocol including a retransmission procedure;
    a plurality of re-reception packet storage devices in which the same number of packets to be re-received and sent from said transmitter as the number of times determined by said retransmission frequency determination unit is stored after being fetched; and
    a data synthesizer synthesizing an output of said received data storage device and an output of said re-reception packet storage device so as to produce correct data.

2. A recovery system for restoring preserved regeneration data, comprising a transmitter that transmits data in units of a packet, and a receiver that receives data from said transmitter in units of a packet, wherein:
    said transmitter includes: a transmitted data storage device in which transmitted data is stored; and an interface through which data is transmitted to said receiver, and through which a packet that is identified with a packet ID indicating a packet to be re-received and being sent from said receiver and that is read from said transmitted data storage device is transmitted to said receiver a plurality of times in response to a request sent from said receiver;
    said receiver includes: a received data storage device in which data received in accordance with a protocol including no retransmission procedure is stored; a retransmission frequency determination unit that determines the number of times of retransmission, by which said transmitter is requested to retransmit a packet to be re-received, according to data received in accordance with the protocol including no retransmission procedure; a re-reception packet ID transmission unit detecting the same number of packet IDs, which indicate packets to be re-received, as the number of times determined by said retransmission frequency determination unit, and transmitting the packet IDs to said transmitter in accordance with a protocol including a retransmission procedure; a plurality of re-reception packet storage devices in which the same number of packets to be re-received and transmitted from said transmitter as the number of times determined by said retransmission frequency determination unit is stored; and a data synthesizer synthesizing an output of said received data storage device and an output of said re-reception packet storage device so as to produce correct data;

said plurality of re-reception packet storage devices receives the last packet to be re-received in accordance with the protocol including a retransmission procedure, and receives packets to be re-received other than the last packet to be re-received in accordance with the protocol including no retransmission procedure.

3. A recovery method for restoring preserved regeneration data, comprising a transmission step of transmitting data from a transmitter in units of a packet, and a reception step of receiving data, which is transmitted at said transmission step, in units of a packet using a receiver, wherein:

said transmission step includes an interface step of transmitting data to said receiver in accordance with a protocol including no retransmission procedure, and a storage step of storing transmitted data in a first storage device;

said reception step includes: a packet ID extraction step of extracting a packet ID, which indicates a packet to be re-received, from data that is received from said transmitter in accordance with the protocol including no retransmission procedure; a second storage step of storing a packet ID, which indicates a packet to be re-received and is extracted by said packet ID extraction unit, in a second storage device; a regeneration step of regenerating received data; a third storage step of storing received data in a third storage device; and a retransmission setting step of transmitting a packet ID, which indicates a packet to be re-received and stored in said second storage device, to said transmitter in accordance with a protocol including a retransmission procedure after the reception of the data, at said transmission step, a packet identified with a packet ID, which indicates a packet to be re-received and is sent from said retransmission setting unit, is read from said first storage device, and transmitted to said receiver in accordance with the protocol including a retransmission procedure;

at said reception step, data that is contained in a packet identified with a packet ID indicating a packet to be re-received and that is stored in said third storage device is overwritten with data contained in a packet that is identified with the packet ID indicating a packet to be re-received and that is sent from said transmitter.

* * * * *